(12) United States Patent
Wiley (10) Patent No.: US 9,112,815 B2
(45) Date of Patent: Aug. 18, 2015

(54) THREE-PHASE-POLARITY SAFE REVERSE LINK SHUTDOWN

(71) Applicant: Qualcomm Incorporated, San Diego, CA (US)

(72) Inventor: George Alan Wiley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 13/662,076

(22) Filed: Oct. 26, 2012

(65) Prior Publication Data

US 2013/0339507 A1    Dec. 19, 2013

Related U.S. Application Data

(60) Provisional application No. 61/660,664, filed on Jun. 15, 2012.

(51) Int. Cl.
*G06F 15/16* (2006.01)
*H04L 12/911* (2013.01)
*H04L 12/12* (2006.01)

(52) U.S. Cl.
CPC .............. *H04L 47/745* (2013.01); *H04L 12/12* (2013.01); *Y02B 60/34* (2013.01)

(58) Field of Classification Search
CPC ....... H04L 47/745; H04L 12/12; Y02B 60/34
USPC ......... 709/200–203, 217–227, 232, 228, 229; 370/227, 230, 235, 252, 345
See application file for complete search history.

(56) References Cited

U.S. PATENT DOCUMENTS

| | | | |
|---|---|---|---|
| 4,201,958 A | 5/1980 | Ahamed | |
| 4,980,898 A | 12/1990 | Silvian | |
| 5,259,002 A | 11/1993 | Carlstedt | |
| 5,359,595 A | 10/1994 | Weddle et al. | |
| 5,381,414 A | 1/1995 | Gibson | |
| 5,563,526 A | 10/1996 | Hastings et al. | |

(Continued)

FOREIGN PATENT DOCUMENTS

| CN | 1871635 A | 11/2006 |
|---|---|---|
| CN | 101171776 B | 5/2011 |

(Continued)

OTHER PUBLICATIONS

International Search Report and Written Opinion—PCT/US2013/045404—ISA/EPO—Sep. 12, 2013.

(Continued)

*Primary Examiner* — Moustafa M Meky
(74) *Attorney, Agent, or Firm* — Raphael Freiwirth (57) ABSTRACT

System, methods and apparatus are described that facilitate data link shutdown between two devices within an electronic apparatus, enabling safe entry into a hibernation mode. A host device transmits a command to a client device over a first data link. If the client device is not transmitting over the second data link, the host devices initiates shut down of the first data link and entry to a hibernation state. A delay may be initiated when it is determined that the client device is transmitting on the second data link. The command may comprise an instruction revoking permission to transmit data over a second data link to cause the client device to terminate communication on the second data link.

32 Claims, 7 Drawing Sheets

(56) References Cited

U.S. PATENT DOCUMENTS

| | | | |
|---|---|---|---|
| 5,664,948 A | 9/1997 | Dimitriadis et al. | |
| 5,682,157 A | 10/1997 | Asmussen et al. | |
| 5,733,131 A | 3/1998 | Park | |
| 5,809,519 A | 9/1998 | Lee | |
| 5,852,630 A | 12/1998 | Langberg et al. | |
| 5,939,939 A | 8/1999 | Gaynor et al. | |
| 6,081,513 A | 6/2000 | Roy | |
| 6,091,709 A | 7/2000 | Harrison et al. | |
| 6,243,761 B1 | 6/2001 | Mogul et al. | |
| 6,256,509 B1 | 7/2001 | Tanaka et al. | |
| 6,278,429 B1 | 8/2001 | Ruth et al. | |
| 6,288,739 B1 | 9/2001 | Hales et al. | |
| 6,346,832 B1 | 2/2002 | Young | |
| 6,359,931 B1 | 3/2002 | Perino et al. | |
| 6,430,196 B1 | 8/2002 | Baroudi | |
| 6,452,420 B1 | 9/2002 | Wong | |
| 6,556,628 B1 | 4/2003 | Poulton et al. | |
| 6,587,037 B1 | 7/2003 | Besser et al. | |
| 6,611,503 B1 | 8/2003 | Fitzgerald et al. | |
| 6,649,377 B1 | 11/2003 | Allard et al. | |
| 6,654,565 B2 | 11/2003 | Kenny | |
| 6,662,019 B2 * | 12/2003 | Kamel et al. | 455/522 |
| 6,694,377 B1 | 2/2004 | Beyer | |
| 6,703,868 B2 | 3/2004 | Savaria et al. | |
| 6,778,493 B1 | 8/2004 | Ishii | |
| 6,797,891 B1 | 9/2004 | Blair et al. | |
| 6,813,638 B1 | 11/2004 | Sevanto et al. | |
| 6,865,610 B2 | 3/2005 | Bolosky et al. | |
| 6,867,668 B1 | 3/2005 | Dagostino et al. | |
| 6,914,637 B1 | 7/2005 | Wolf et al. | |
| 7,113,550 B2 | 9/2006 | Stonecypher et al. | |
| 7,143,177 B1 | 11/2006 | Johnson et al. | |
| 7,145,411 B1 | 12/2006 | Blair et al. | |
| 7,233,773 B2 | 6/2007 | Hansen et al. | |
| 7,263,133 B1 | 8/2007 | Miao | |
| 7,269,430 B2 | 9/2007 | Moorti et al. | |
| 7,336,139 B2 | 2/2008 | Blair et al. | |
| 7,339,502 B2 | 3/2008 | Furtner | |
| 7,529,957 B2 | 5/2009 | Krantz et al. | |
| 7,688,929 B2 | 3/2010 | Co | |
| 7,826,551 B2 | 11/2010 | Lee et al. | |
| 7,859,356 B2 | 12/2010 | Pandey | |
| 8,024,477 B2 | 9/2011 | Rothman et al. | |
| 8,064,535 B2 | 11/2011 | Wiley | |
| 2002/0061072 A1 | 5/2002 | Pickering et al. | |
| 2002/0064247 A1 | 5/2002 | Ahn et al. | |
| 2002/0112070 A1 | 8/2002 | Ellerbrock et al. | |
| 2002/0181618 A1 | 12/2002 | Muranaka | |
| 2003/0117184 A1 | 6/2003 | Fecteau et al. | |
| 2004/0039504 A1 | 2/2004 | Coffee et al. | |
| 2005/0012492 A1 | 1/2005 | Mihalka | |
| 2005/0144225 A1 | 6/2005 | Anderson et al. | |
| 2005/0151868 A1 | 7/2005 | Fraenkel et al. | |
| 2005/0156755 A1 | 7/2005 | Miller | |
| 2005/0204057 A1 | 9/2005 | Anderson et al. | |
| 2006/0034326 A1 | 2/2006 | Anderson et al. | |
| 2006/0192697 A1 | 8/2006 | Quick et al. | |
| 2006/0271678 A1 | 11/2006 | Jessup et al. | |
| 2007/0009018 A1 | 1/2007 | Wang | |
| 2007/0160155 A1 | 7/2007 | Choi | |
| 2007/0164884 A1 | 7/2007 | Ihs | |
| 2009/0082056 A1 * | 3/2009 | Iwanaga et al. | 455/522 |
| 2009/0225873 A1 | 9/2009 | Lee et al. | |
| 2010/0215118 A1 | 8/2010 | Ware et al. | |
| 2010/0235673 A1 | 9/2010 | Abbasfar | |
| 2011/0084737 A1 | 4/2011 | Oh et al. | |
| 2011/0138210 A1 | 6/2011 | Belali et al. | |
| 2011/0268225 A1 | 11/2011 | Cronie et al. | |
| 2011/0294359 A1 | 12/2011 | Cho et al. | |
| 2011/0299555 A1 | 12/2011 | Cronie et al. | |
| 2011/0302478 A1 | 12/2011 | Cronie et al. | |
| 2012/0051241 A1 | 3/2012 | Mori et al. | |
| 2012/0155565 A1 | 6/2012 | Wiley | |
| 2012/0230626 A1 | 9/2012 | Metz et al. | |
| 2013/0051162 A1 | 2/2013 | Amirkhany et al. | |
| 2013/0215991 A1 | 8/2013 | Wiley | |
| 2013/0241759 A1 | 9/2013 | Wiley et al. | |
| 2014/0003543 A1 | 1/2014 | Wiley | |
| 2014/0006649 A1 | 1/2014 | Wiley et al. | |
| 2014/0112401 A1 | 4/2014 | Wiley et al. | |
| 2014/0153665 A1 | 6/2014 | Wiley et al. | |

FOREIGN PATENT DOCUMENTS

| | | |
|---|---|---|
| EP | 1207649 | 5/2002 |
| JP | 2002199032 A | 7/2002 |
| WO | 9202988 A1 | 2/1992 |
| WO | WO2005041164 | 5/2005 |
| WO | 2011134678 A1 | 11/2011 |
| WO | 2011151469 A1 | 12/2011 |
| WO | 2012089803 A2 | 7/2012 |

OTHER PUBLICATIONS

Hsueh, "Crosstalk Suppression Technique for Multi-Wire High-Speed I/O Links," ProQuest Dissertations and Theses; 2010; UCLA, 189 pages.

John Poulton, et al., "Multiwire Differential Signaling," UNC-CH Department of Computer Science, Version 1.1, Aug. 6, 2003.

Sevanto, J., "Multimedia messaging service for GPRS and UMTS", IEEE on WCNC, Sep. 1999, pp. 1422-1426, vol. 3.

Zheng, "Skew compensation techniques for multi-gigabit wire-line data communications," Dissertation, The University of Texas at Dallas, 2010, 126 pages.

Zogopoulos, "A Low-Power High-Speed Single-Ended Parallel Link Using Three-Level Differential Encoding," USC, Dissertation, May 2007, 92 pages.

Taiwan Search Report—TW102121240—TIPO—Feb. 13, 2014.

* cited by examiner

THREE-PHASE-POLARITY SAFE REVERSE LINK SHUTDOWN

CROSS-REFERENCE TO RELATED APPLICATION(S)

This application claims the benefit of U.S. Provisional Application Ser. No. 61/660,664 entitled "Three-Phase-Polarity Safe Reverse Link Shutdown" and filed on Jun. 15, 2012, which is expressly incorporated by reference herein in its entirety.

BACKGROUND

1. Field

The present disclosure relates generally to high-speed data communications, and more particularly, to asymmetric communications between components of electronic devices.

2. Background

A race condition can exist when a host sends a Link Shutdown Packet over a forward data link to a client over an asymmetric data link. The client may concurrently have begun transmission of data over a reverse data link. If the host shuts down the forward link, the reverse link may lose its transmission clock because the forward link would be in hibernation while the client is attempting to reverse packets.

SUMMARY

Embodiments disclosed herein provide systems, methods and apparatus for communicating between two devices that may be collocated in an electronic apparatus and communicatively coupled through one or more data links. When link shutdown is required, certain embodiments of the invention enable orderly shutdown of the one or more data links and safe entry to hibernation mode.

In an aspect of the disclosure, systems, methods and apparatus for data communication transmit a command to a client device over a first data link, determine whether the client device is transmitting over the second data link, cause the first and second data links to enter a hibernation state. A delay may be initiated before entering the hibernation state when it is determined that the client device is transmitting on the second data link when the command is transmitted. The command may comprise an instruction revoking permission to transmit data over a second data link In an aspect of the disclosure, the first data link supports a data rate that is at least an order of magnitude faster than the data rate supported by the second data link. Data communicated over the first data link may be transmitted in N-phase polarity encoded data symbols. The first and second data links may be provided in an apparatus that houses the client device and a host device. The N-phase polarity encoded data symbols are typically transmitted by the host device and may include 3-phase encoded data symbols.

In an aspect of the disclosure, the command comprises a data link shutdown packet. The data rate supported by the second data link may be determined based on information provided in the data link shutdown packet. The information provided in data link shutdown packet may include a divisor for frequency dividing a clock extracted from the first data link.

In an aspect of the disclosure, data communicated over the second data link may be transmitted using a clock derived from the N-phase polarity encoded data symbols. Data communicated over the second data link may be clocked in synchronism with the N-phase polarity encoded data symbols.

In an aspect of the disclosure, the first and second data links may enter a hibernation state when transmission on the first data link is terminated. Terminating transmission on the first data link may cause the clock to be terminated, thereby preventing communication through the second data link.

In an aspect of the disclosure, the first and second data links are caused to exit the hibernation state responsive to a wakeup signal received from the client device. In an aspect of the disclosure, the command may be carried in a data packet. The delay may have a duration which ensures that the client device has received the data packet carrying the command. The delay may have a duration determined by a packet transmission time associated with the first or second data link.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Figure 1:
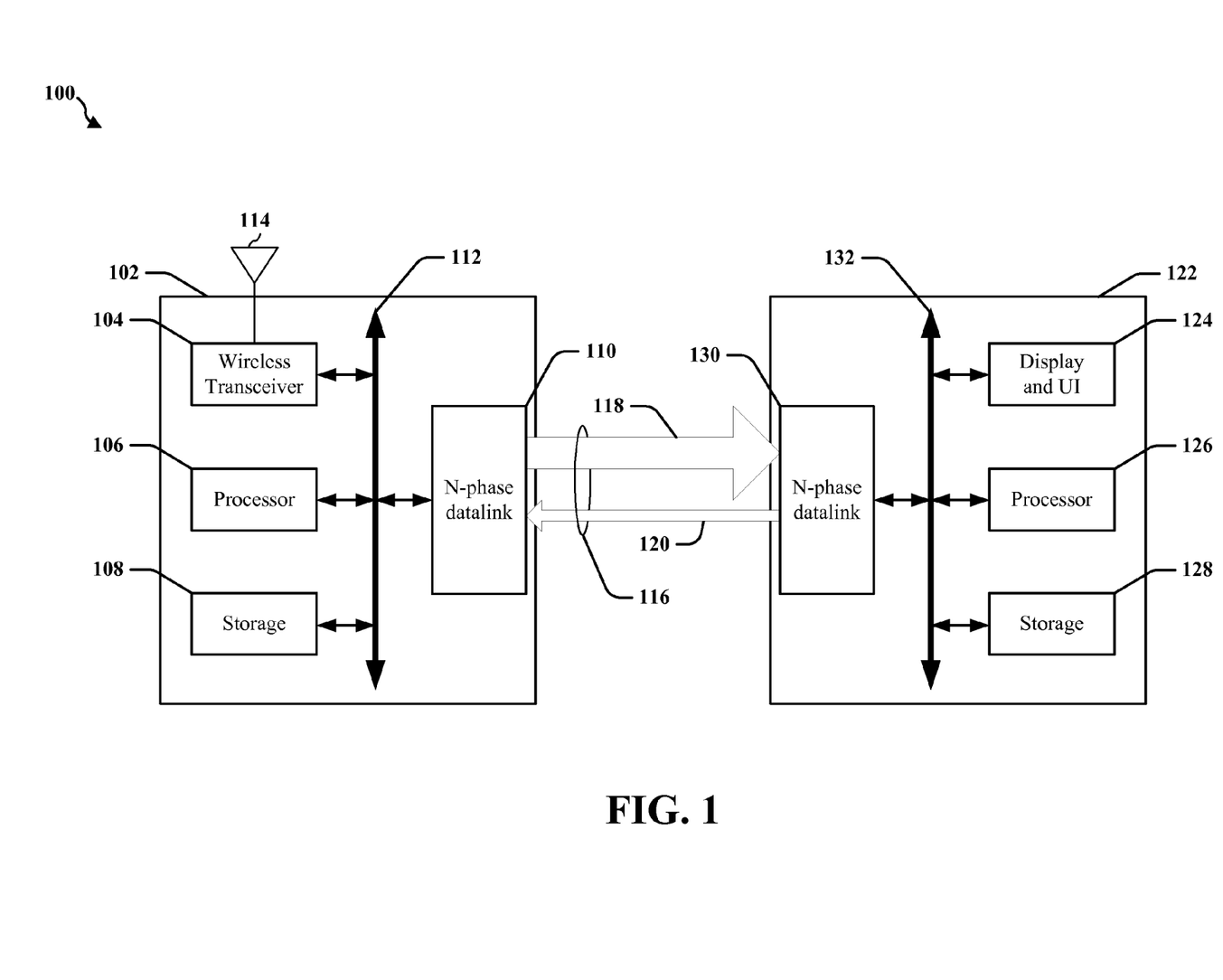
FIG. 1 depicts a system employing an asymmetric data link between devices.

Certain embodiments of the invention may be applicable to communications links deployed between electronic components that may include subcomponents of a device, such as telephone, mobile computing device, appliance, automobile electronics, avionics systems, etc. FIG. 1 illustrates an example in which a communication link 116 is used to connect components 102 and 122 of a system 100, In the example, the In this example, system 100 may comprise a mobile computing system, a wireless telephone, notebook computer, media player, gaming devices, or the like. Communications link 116 may be bidirectional and asymmetrical, comprising forward data link 118 and reverse data link 120, in which the timing of reverse link 120 is derived from the timing of forward link 118 (or vice versa). In one example, the forward link 118 may comprise a high speed link communicating data from first processing device 102 to a second processing device 122. Forward link 118 may comprise a wired bus having a plurality of signal wires, each carrying encoded data.

First processing device 102 may perform core functions of the computing system 100, including maintaining wireless communications through wireless transceiver 104 and antenna 114, while second processing device 122 may support user interface 124 that may comprise display drivers and user display such as a liquid crystal display (LCD) panel, touch-screen, keyboard voice-recognition and other input devices. User interface 124 may provide audio input and output. Storage 108 and 128 may comprise volatile and nonvolatile storage for maintaining instructions and data used by respective processors 106 and 126. Communication between processors 106 and 126, storage 108 and 128 and other devices 104, 110, 124 and 130 may be facilitated by one or more bus 112 and 132. First processing system 102 may be designated as a host system, or host-end transmitter, while second processing system 122 may be designated as a client system or receiver.

Reverse link 120 may operate at a lower speed than forward link 118 and may communicate control, command and other information from the second processing device 122 to the first processing device 102. The forward and reverse data transmission rates may differ by orders of magnitude. In some embodiments, the reverse link 120 derives a clocking signal from the forward link 118 for synchronization purposes, for control purposes, to facilitate power management and/or for simplicity of design. The clocking signal may have a frequency that is obtained by dividing the frequency of a symbol clock used to transmit signals on the forward link 118. Symbol clock may be superimposed or otherwise encoded in symbols transmitted on forward link 118. The use of a clocking signal that is a derivative of the symbol clock allows fast synchronization of transmitters and receivers (transceivers 110, 130) and enables fast start and stop of data signals without the need for framing to enable training and synchronization.

In one example, communication link 116 comprises a high-speed digital interface, such as a mobile display digital interface (MDDI), and one or more data links 118 and 120 may use N-phase polarity encoding. Transceivers 110 and 130 may encode and decode data transmitted on link 116. The use of N-phase polarity encoding provides high speed data transfer and may consume half or less of the power of other interfaces because fewer drivers are active in N-phase polarity encoded data links 116. N-phase polarity encoding devices 110 and/or 130 encode multiple bits per transition on the interface, which may comprise a bus. In one example, 3-phase polarity encoding may be used to support a wide video graphics array (WVGA) 80 frames per second LCD driver IC without a frame buffer, delivering pixel data at 810 Mbps for display refresh. When 3-phase polarity encoding is used, signals on a 3-line bus are driven either positive, negative, or are undriven (high-impedance). Each signal may be driven to one of three states (denoted as +1, −1, or 0) using unit-level current-mode drivers (see FIG. 2). At least one signal is at 0 state for each symbol transmitted, and the number of signals driven positive (+1 state) is equal to the number of signals driven negative (−1 state), such that the sum of current flowing to the receiver is always zero.

At the transmitter, data is input to an optional mapper, which maps the input word to a series of symbols to be sent over the bus. An M-Phase N-wire driver may receive one symbol at a time from the mapper (see FIG. 4). One purpose of the mapper is to compute the values of a group of symbols based on an input data word. This is particularly useful if the number of bits per symbol is not an integer. In the simple example of a 3-wire system, there are 3 combinations of driving 2 wires simultaneously, and 2 possible combinations of polarity on the pair of wires that are driven, yielding 6 possible states. 5 of the 6 states are usable because a transition is required between any two symbols. With 5 states there may be up to $\log_2(5) \cong 2.32$ bits per symbol, so it is possible for the mapper to accept a 16-bit word and convert it to 7 symbols, utilizing $16/7 \cong 2.28$ bits per symbol.

Figure 2:
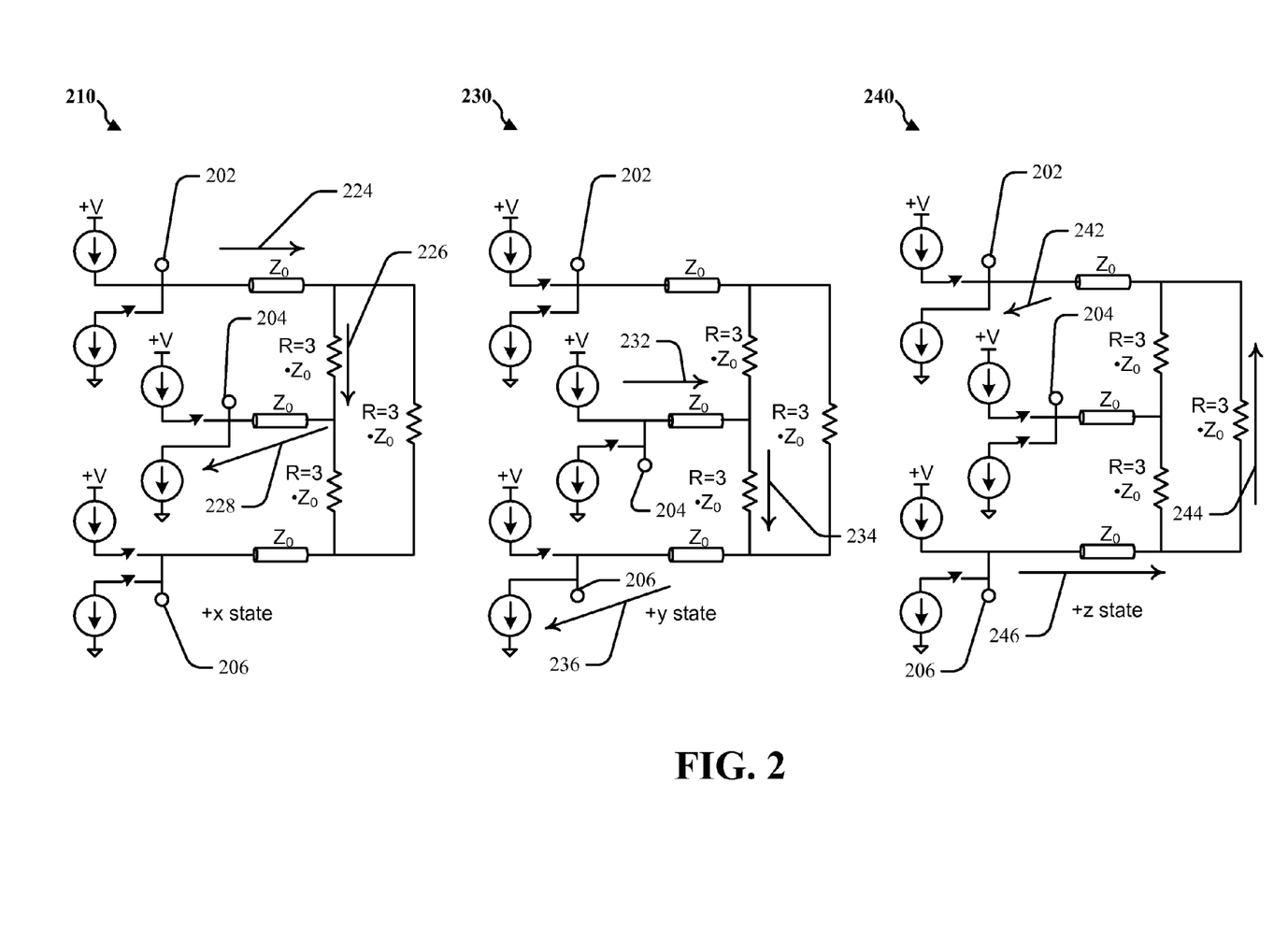
FIG. 2 illustrates N-phase polarity data encoding.
Figure 4:
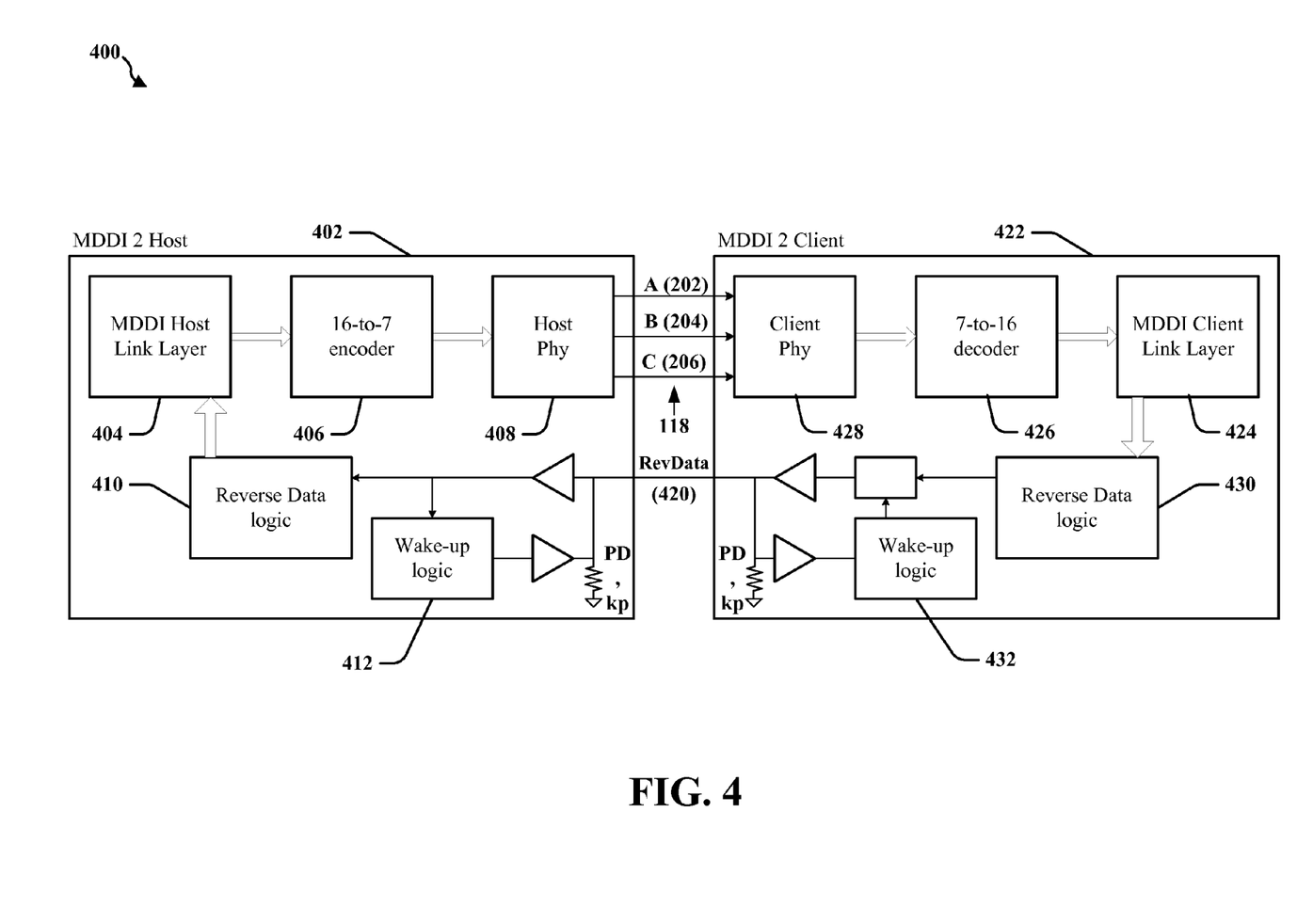
FIG. 4 illustrates certain aspects of a 3-phase polarity data encoding system.

FIG. 2, with further reference to FIG. 4, illustrates certain aspects of the system in the simplified example depicted in FIG. 1. FIG. 4 illustrates a system that employs 3-phase polarity encoding on the data link 118 and FIG. 2 illustrates certain elements of host physical layer 408. Host physical layer 408 may be at least partially embodied in transceiver 110, while client physical layer 428 components maybe at least partially embodied in transceiver 130. Some or all of data encoder 406, link layer logic 404, reverse data logic 410 and other logic, including wakeup logic 412 may also be embodied in transceiver 110. Some or all of data decoder 426, link layer logic 424, reverse data logic 430 and other logic, including wakeup logic 432 may also be embodied in transceiver 130.

N-phase polarity encoding may be understood from the example of 3-phase polarity encoding. As shown in FIG. 2, current is passed through two of three signals measureable at terminals 202, 204, 206, with no current passed through the third signal, when data link 118 is active. Each phase state can have either a positive or negative polarity, although FIG. 2 shows only the positive polarity condition of each phase state to simplify description. To obtain a "+x" state, current is passed 232, 234, 236 from terminal 202 to terminal 204. To obtain a "+y" state, current is passed 234, 236, 238 from terminal 204 to terminal 206. To obtain a "+z" state, current is passed 246, 244, 242 from terminal 206 to terminal 202. The undriven signal is pulled to a neutral voltage by termination resistors at the receiver.

Figure 3:
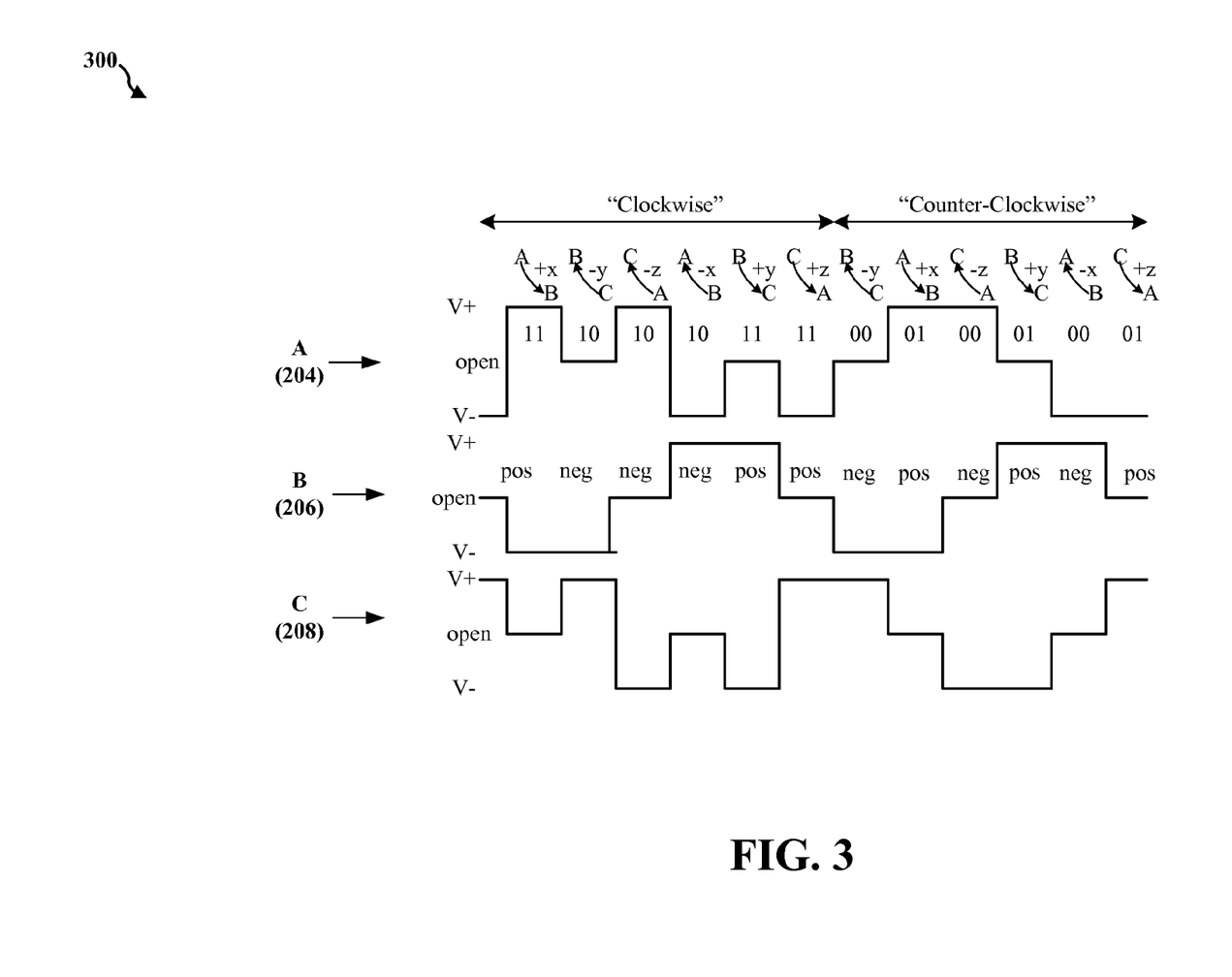
FIG. 3 illustrates an N-phase polarity data encoded signal.

FIG. 3 shows an example waveform of a three phase polarity encoded signal. Six possible combinations of phase and polarity are defined. The encoding method is self-clocking, having a transition at every symbol interval. With six possible states, there are five possible transitions to the next state from any present state. More than two bits of information can be encoded into each symbol interval. In the example depicted, up to $\log_2(5)$ or 2.3219 bits can be encoded into each symbol interval and seven consecutive symbols may be used to transmit 16 bits of information. Unused information may be used for error correction or to carry link control information.

Data for the reverse link 120 may be sent on the digital CMOS RevData signal 420 which is separate from the high-speed trios of forward link signals 202, 204, and 206. Rev-Data signal 420 may also be used for signaling that wakes-up system 400 from hibernation and it is typically placed into a high-impedance state while the link is in hibernation. Pull-down resistors or keepers may be used to hold the RevData signal 420 at a logic zero level while the link is in the hibernation state.

Data may be transmitted on the reverse link 120 at a rate that is a fraction of the forward link transmission rate. In one example, transmission rate on the forward link may exceed 1G symbols per second for 3-phase polarity encoding. Moreover, signal slew rate may be limited on the reverse link 120 to minimize emissions, thereby reducing transmission rate further. In one example, the reverse data rate may be approximately 1 Mbps.

The forward link 118 may enter a hibernation state to reduce system power consumption. While hibernating, the first processing system 102 may cease to participate in communications with the second processing system 122 and the second processing system 122 may no longer receive timing information for use in reverse link communication. Moreover, power management policies may require the second processing system 122 to hibernate or otherwise implement power conservation processes when the first processing system 102 hibernates.

Certain embodiments provide systems, methods and apparatus that prevent "reverse link left hanging" situations, where the forward link 118 is shut down, thereby stopping the reverse link 120 in mid-transmission of a packet. Such shutdown may prevent second processing system 122 from performing other tasks and functions including waking up the data link 116.

In some embodiments, second processing system 122 may store state information including permission information that identifies whether second processing system 122 has permission to send reverse data to the host. The second processing system 122 may be configured such that permission state is initialized to "no permission to send reverse data" when the link 116 exits hibernation state. Accordingly, first processing system 102 can enter and exit hibernation rapidly without danger of receiving an unsolicited message from the client.

A command or flag may be defined to grant or revoke permission for the second processing system 122 to send reverse data. This command or flag can comprise a forward packet that is sent by the first processing system 102 after the link wakes up from hibernation. The receipt of the forward packet may grant the second processing system 122 permission to send reverse data to the first processing system 102.

In some embodiments, the first processing system 102 sends a packet comprising a command or flag that revokes the permission for the second processing system 102 to send reverse data before setting initiating hibernation on link 116. When the second processing system 122 receives the packet revoking permission to transmit on reverse link 120, it will typically cease further terminations without delay. However, when second processing system 122 has already begun transmission of a packet, then the second processing system 122 may finish transmitting that packet, but may cease further transmission until permission is again granted to transmit. Note that, while in hibernation, the second processing system 122 may wake the first processing system 122 through a transmission or other signaling on the reverse link 120, regardless of the reverse data permission state. In some embodiments, permission state only applies when the link is operational (awake). In some embodiments, the permission state may be initialized automatically or by command upon wake-up.

Certain embodiments avoid the occurrence of race condition which may otherwise arise when the first processing system 102 sends a command or packet indicating that the link 116 should be shut down, at the same time that the second processing system 122 begins to send an element or packet of reverse data. If the race condition is not prevented, the link 116 may enter and remain in hibernation while the second processing system 122 attempts to transmit the reverse packet. Race conditions may be prevented by causing the first processing system 102 to send a packet or command to the second processing system 122 prior to putting the link 116 into hibernation. In some embodiments, the first processing system 102 may first send a packet that denies or revokes permission to send reverse data. The first processing system 102 may then wait for a predetermined delay to ensure that the second processing system 122 has completed transmission, before sending the link shutdown packet and/or command. The predetermined delay may be selected to account for the time taken for a packet to be sent by the first processing system 102 and properly received by the second processing system 122. In some embodiments, the predetermined delay has a sufficiently long duration to permit the second processing system 122 to finish transmission and disable its reverse data permission state in response to the revocation of permission. In some embodiments, the predetermined delay has a sufficiently long duration to permit the first processing system 102 to detect the leading edge of a reverse packet sent by the second processing system 122.

In some embodiments, the second processing system 122 may be configured to immediately stop transmission of a reverse packet when the link shutdown packet and/or command is received, if transmission is already in progress. The second processing system 122 may cause the output signals 202, 204 and 206 (see FIG. 2) to be forced to zero, to high impedance, and/or to another predefined state. The second processing system 122 may disable output from transceiver 130. A packet in transmission when the second processing system 122 forces shutdown may be rescheduled for transmission. In some embodiments, a packet that was being transmitted is dropped. The first processing system 102 may also stop its reverse packet receiving process and may flag the incomplete packet as an error condition sent to protocol handlers. The protocol handlers may request retransmission, ignore the dropped packet or perform some other corrective action appropriate to the application and to the type of data being transmitted in the dropped packet. In one example, one or both of the first processing system 102 and the second processing system 122 may record the dropped packet as an error so that upper level protocols may detect the error and initiate a request for corrective action from the other processing system 102 or 122 by exchanging or communicating, for example, one or more of a command, status or request.

In certain embodiments, data transmitted on reverse link 120 is clocked using timing information derived from signals transmitted on forward link 118. Typically, a symbol clock signal corresponding to symbol timing on the forward link 118 is extracted and divided to obtain a slower clock, synchronized with transceiver 110, for transmitting data on the reverse link 120. In one example, the symbol clock may be divided by a 128, 256, 512, 1024, 2048, etc., to simplify clock generation circuitry. When N-phase polarity encoding is used, multiple signal lines 202, 204, and 206 are available for clock generation purposes. In 3-phase polarity encoding, each signal line 202, 204, and 206 cycles between one of three states (positive, null, and negative) and a null is cycled between the three signal lines 202, 204, and 206 in a clockwise or counter-clockwise direction. Any combination of the three signal lines 202, 204, and 206 may be used to generate a clock signal. In some embodiments, a clock signal generated from a first trio of signals 202, 204, and 206 may be used to generate clock signals for multiple trios.

In some embodiments, bandwidth may be increased by using multiple 3-phase polarity encoders rather than using an N-phase encoder where N is greater than 3. Advantages of using multiple 3-phase polarity encoders include the ability to conserve power by selectively enabling more or fewer encoders to match bandwidth demand. In some embodiments, one of a plurality of 3-phase encoders may be designated as a primary encoder, which is the last encoder placed in hibernation, thereby ensuring that the clock, when available can be derived from the primary encoder. In some embodiments, a signal from each of a plurality of N-phase priority encoders is gated to obtain a clock signal. If any of the N-phase decoders is transmitting the gated signal includes a clock signal, although the duty cycle may be impaired due to skew between the N-phase priority encoders.

In some embodiments, the processing systems 102 and 122 operate the forward and reverse links 118 and 120 independently of one another. Complete independence between the forward and reverse links may require more complex signaling on the reverse link 120 which may comprise a single connector. A separate clock signal is not available when a single connector is used on the reverse link 120 and independence of operation preclude the derivation of timing from the forward link 118. Receive logic in transceiver 110 may become more complex, and may require certain assumptions to be made, or explicit and/or implicit agreement of the reverse data rate. In some embodiments, a training sequence may be embedded in the reverse data stream so that the first processing system 102 can constantly adapt data sampling to the rate of data sent by the client. Transceiver 110 may be provided with additional logic, including one or more phase locked loops to accommodate the use by processing system 122 of internally generated clocks from components such as an LCD driver device, which may be relatively inaccurate and/or suffer from drift.

In certain embodiments, reverse data bit rate time defaults to a predetermined frequency or to a rate determined by a divisor value. For example, a default rate for the reverse link 120 may be calculated as 256 forward link words, where one forward link word is seven symbols. Default and current divisor parameters may be defined by the by the first processing system 102 and communicated in a reverse rate divisor packet. In some embodiments, the divisor may be set by a link shutdown packet. Some embodiments permit the divisor to be modified on-the-fly. However, the second processing system 122 may not react quickly to on-the-fly rate changes to ensure that reverse data capture circuits in the first processing system 102 and a reverse data timing circuit in the second processing system 122 may need time to ensure that synchronism is maintained. Accordingly some embodiments restrict parameter changes to new values to initialization when the link 116 exits from hibernation. A link shutdown packet sent to force hibernation may be used for the purpose of changing timing-related parameters. Some embodiments communicate reverse rate divisor in other packets, which may be defined for the purpose, although parameters communicated in this manner may also take effect only when the processing systems 102 and 122 wake up from hibernation. In some embodiments, reverse packets are not required to be continuous and may not be present when the forward data link 118 is active, and the reverse rate divisor may be updated on-the-fly. The reverse rate divisor may also be updated while the forward link 118 is active and when the client 122 does not have permission to transmit. The actual value of the reverse rate divisor can be defined as either the number of forward link words per reverse link clock, or half of that amount.

In some embodiments, hibernation is entered after the first processing system 102 transmits one or more of a shutdown packet and a "frozen state" packet. The frozen state may cause the transceiver 110 to hold the outputs in an all-zeros state in order to prevent skew between data and output and to keep the outputs static while the drivers are disabled. The minimum duration of the frozen state may be selected to resolve any skew between the A, B, and C outputs 202, 204, and 206 and an output enable signal.

In some embodiments the first processing system 102 wakes up the link 116 by enabling operation of high-speed outputs 202, 204, and 206. The outputs 202, 204, and 206 may be kept in a constant phase and rotation state while they are being enabled. This phase and rotation state may comprise any of the six possible states available in 3-phase priority encoding, for example. The initial state may be the same as, or different from the state that was driven in the frozen state while the link 116 went into hibernation. When the receiver 122 detects that the link 118 is active, it enables its receivers and high-speed outputs 202, 204, and 206 are fully enabled. Typically, minimum duration of the frozen state is long enough to account for uncertainty in the host output enable time, the client's receiver enable time, delay in the RevData 420 as it is transmitted from the host 402 to the client 422.

After initialization of the link 116, a sequence of all zeros may be transmitted for use as a clock in the second processing system 122. The first processing system 102 may transmit a sync packet that initializes byte or word framing at the receiver 122 for data recovery from the serial link 116. Following the sync packet, other packets may be transmitted. The first processing system may also grant the second processing system 122 permission to send reverse packets over the reverse data link 420.

Certain aspects of the present invention facilitate an orderly shutdown sequence between the first and second processors and can prevent situations in which the forward link shuts down while the reverse link is actively transmitting a packet or other unit of data (reverse link left hanging). The reverse link may be used to signal the first processor to wake up the link, and an indeterminate state caused by premature shutdown of the reverse link may prevent proper function of the system To prevent "reverse link hanging", client 422 stores state information that represents when the client 422 has permission to send reverse data. When the system comes out of hibernation, client permission state is initialized to not have permission to send reverse data. A forward packet is defined that either grants or revokes permission for the client to send reverse data. This packet can be sent by the host 402 after wake up from hibernation to grant the client permission to send data. Before the link enters hibernation, the host 402 may revoke the client's 422 permission to send reverse data. If the client 422 receives a packet revoking permission to transmit, after or while it has begun to transmit a packet, then the client 422 may finish transmitting of that packet and not transmit again until granted permission. When the link is in hibernation the client 422 may wake up the host 402 regardless of the previous value of this reverse data permission state. The permission state typically applies only when the link is awake. A race condition can exist if the host 402 sends a Link Shutdown Packet and at the same time the client 422 begins to send reverse data. A result may be that the link would be in hibernation while the client 422 has started to send a reverse packet. To prevent this, the host 402 may send a packet to revoke the client's 422 transmission permissions for reverse data before the host 402 puts the link 116 into hibernation. The host 402 may first deny the client 422 permission to send reverse data, then wait for a short delay and confirm that the client is not sending a packet before the host 402 sends a Link Shutdown Packet. This short delay typically accounts for the time it takes for the packet to be sent by the host and be properly received by the client 422, and may also include time for the client 422 to respond to the reverse permission packet and disable its reverse data permission state, and time for the leading edge of a reverse packet to be sent from the client and detected in the host 402.

Figure 5:
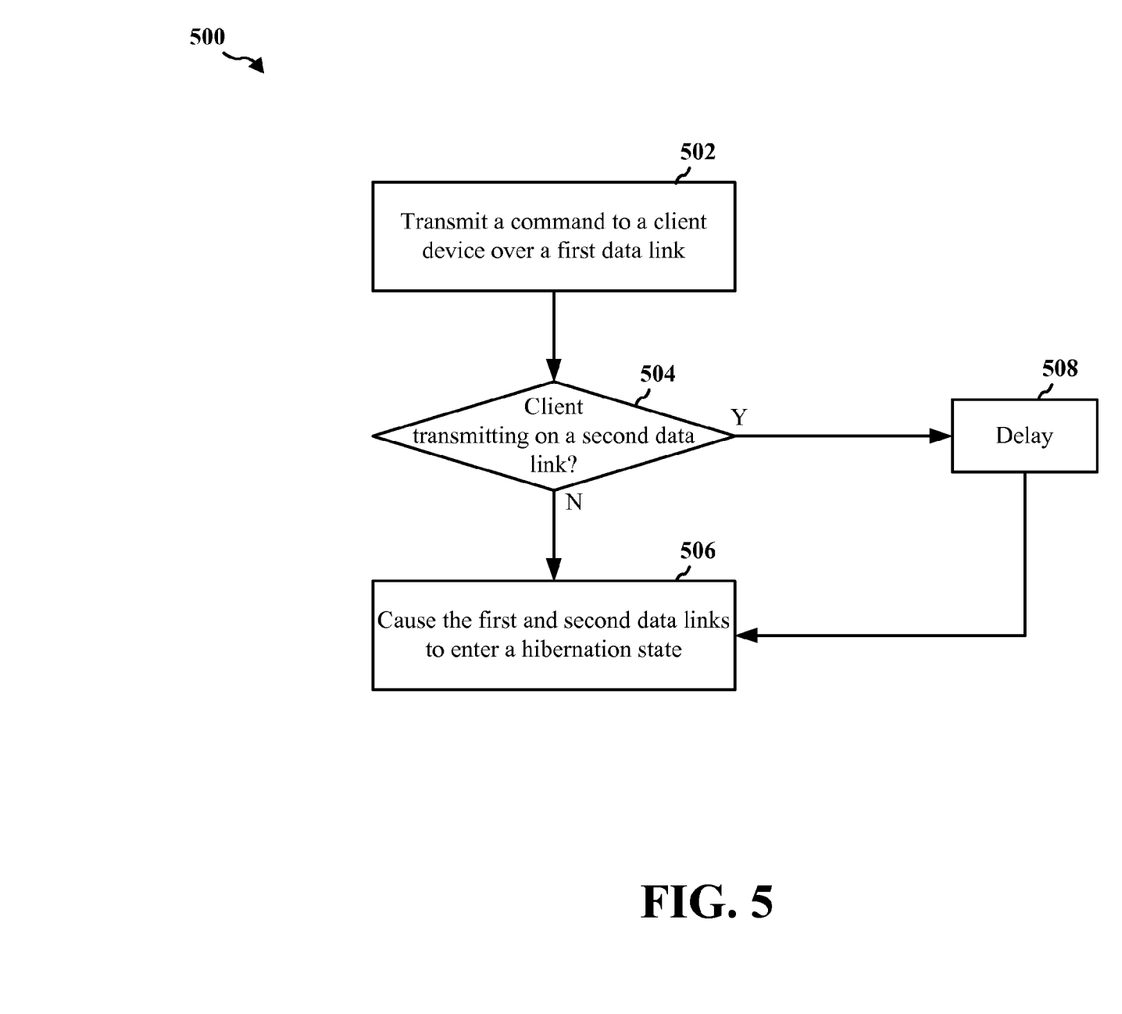
FIG. 5 is a flow chart of a method of data communication.

FIG. 5 is a flow chart 500 of a method of wireless communication. The method may be performed by a host device in an electronic apparatus. At step 502, the host transmits a command to a client device over a first data link. The command may comprise an instruction revoking permission to transmit data over the second data link. The client is typically a transmitter on the second data link. The command may be carried in a data packet.

In some embodiments, the first data link supports a data rate that is at least an order of magnitude faster than the data rate supported by the second data link. Data communicated over the first data link may include N-phase polarity encoded data symbols. The first and second data links may be provided in the electronic apparatus that houses the client device and host device and the N-phase polarity encoded data symbols may be transmitted by the host device. The N-phase polarity encoded data symbols may include 3-phase encoded data symbols.

At step 504, the host determines whether the client device is transmitting over the second data link.

If the client is not transmitting over the second data link, then at step 506, the host causes the first and second data links to enter a hibernation state.

If the client is transmitting over the second data link, then at step 508, the host enters a delay before causing the first and second data links to enter the hibernation state at step 506. The delay may have a duration sufficient to ensure that the client device has received the data packet carrying the command. The delay may have a duration determined by a packet transmission time associated with the first data link. The delay may have a duration determined by a packet transmission time associated with the second data link.

In some embodiments, the command comprises a data link shutdown packet. The data rate supported by the second data link may be determined based on information provided in the data link shutdown packet. The information provided in data link shutdown packet includes a divisor for frequency dividing a clock extracted from the first data link.

In some embodiments, the data communicated over the second data link may be transmitted using a clock derived from the N-phase polarity encoded data symbols. Data communicated over the second data link may be clocked in synchronism with the N-phase polarity encoded data symbols. The first and second data links may be caused to enter a hibernation state includes terminating transmission on the first data link. Transmission on the first data link may be terminated when the clock terminates, thereby preventing communication through the second data link.

In some embodiments, the host causes the first and second data links to exit the hibernation state responsive to a wakeup signal received from the client device.

Figure 6:
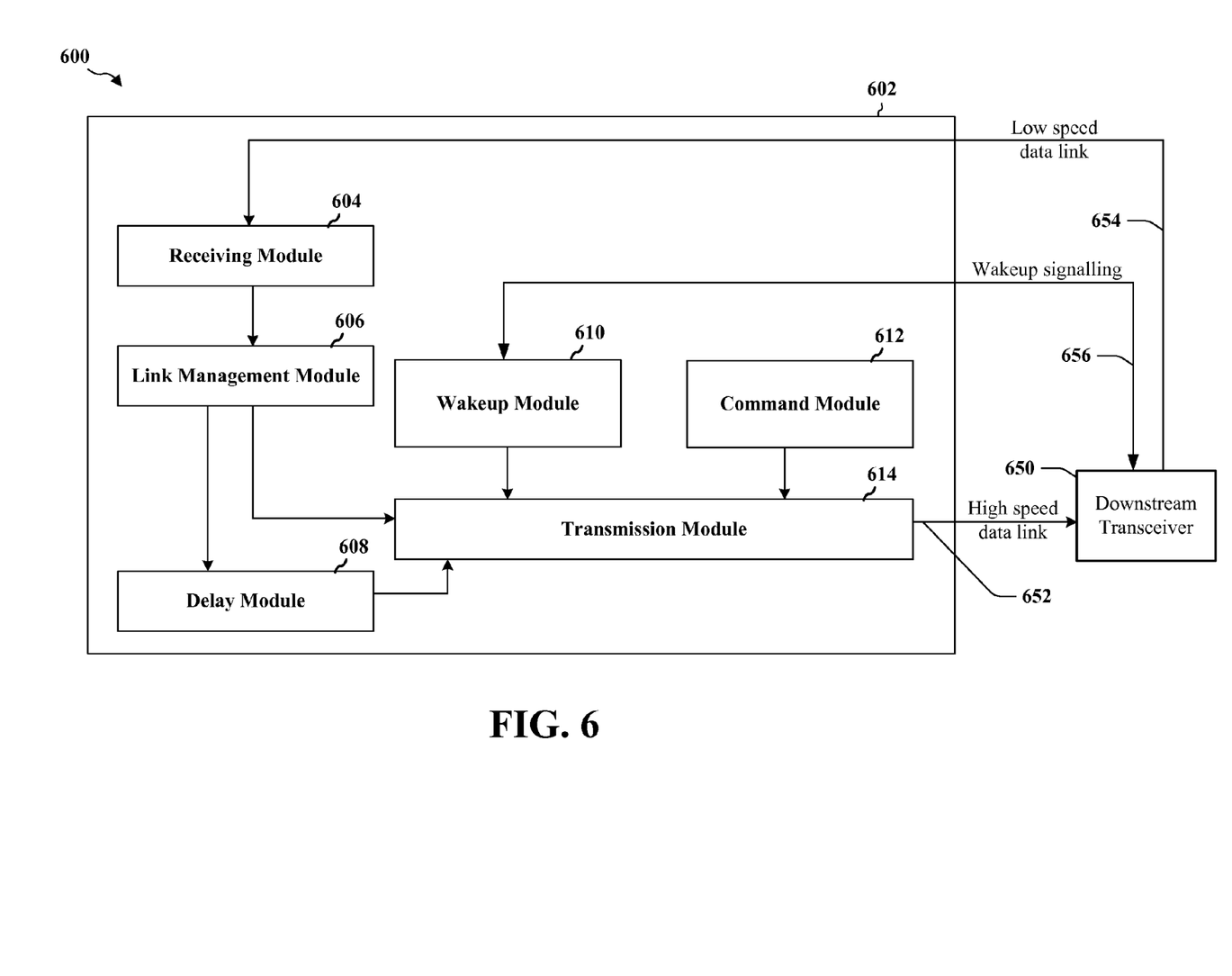
FIG. 6 is a conceptual data flow diagram illustrating the data flow between different modules/means/components in an exemplary apparatus.

FIG. 6 is a conceptual data flow diagram 600 illustrating the data flow between different modules/means/components in an exemplary apparatus 602. The apparatus may be a host device that is housed in a single apparatus, such as a mobile computing device, telephone, appliance, or other multiprocessor computing device. The apparatus includes a receiving module 604 that receives communication from a second data link 120, a link management module 606 that determines whether processing system 122 is transmitting, a delay module 608 that delays hibernation and/or wakeup, a wakeup module 610 that reestablishes data communication over data link 116, a command module 612 that generates and transmits commands to a client processing system 122, and a transmission module that encodes data for transmission on first data link 118.

The apparatus may include additional modules that perform each of the steps of the algorithm in the aforementioned flow charts of FIG. 5. As such, each step in the aforementioned flow charts of FIG. 5 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 7:
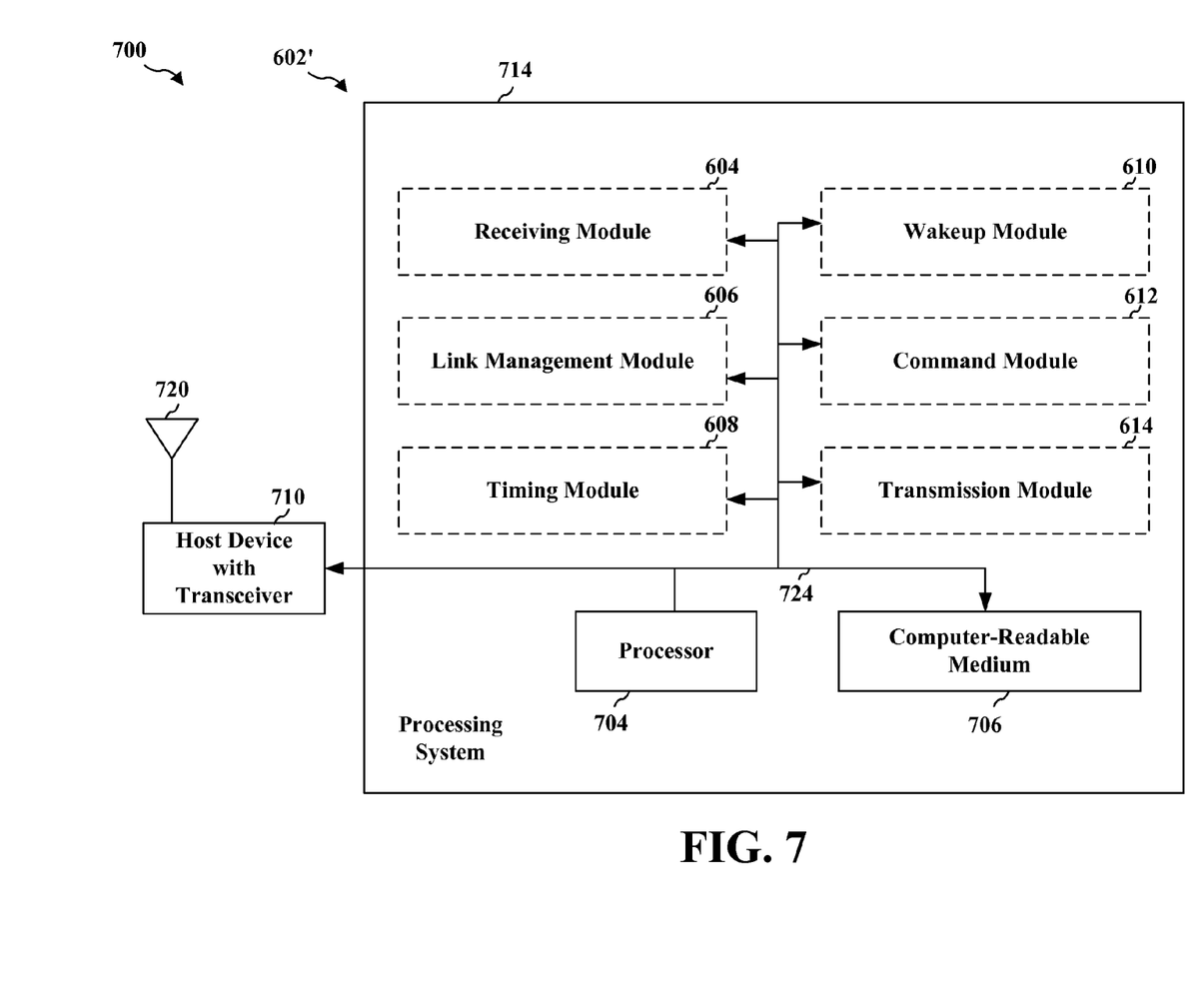
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, represented by the processor 704, the modules 602, 604, 606, 608, 612, 614 and the computer-readable medium 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The processing system 714 includes a processor 704 coupled to a computer-readable medium 706. The processor 704 is responsible for general processing, including the execution of software stored on the computer-readable medium 706. The software, when executed by the processor 704, causes the processing system 714 to perform the various functions described supra for any particular apparatus. The computer-readable medium 706 may also be used for storing data that is manipulated by the processor 704 when executing software. The processing system further includes at least one of the modules 604, 606, 608, 610, 612, and 614. The modules may be software modules running in the processor 704, resident/stored in the computer readable medium 706, one or more hardware modules coupled to the processor 704, or some combination thereof.

In one configuration, the apparatus 602/602' for wireless communication includes means for means 612 and 614 for transmitting a command to a client device 122 over a first data link 118, the command comprising an instruction revoking permission to transmit data over a second data link 120, means 606 for determining whether the client device 122 is transmitting over the second data link 120, means 608 and 612 for causing the first and second data links to enter a hibernation state when it is determined that the client device is not transmitting on the second data link, and means 610 for causing the first and second data links to exit the hibernation state. The aforementioned means may be one or more of the aforementioned modules of the apparatus 602 and/or the processing system 714 of the apparatus 602' configured to perform the functions recited by the aforementioned means.

Further disclosure is included in the Appendix.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for data communications, comprising:
   transmitting a command to a client device over a first data link, the command being encoded in one or more N-phase polarity encoded symbols and comprising an instruction revoking permission to transmit data over a second data link;
   determining whether the client device is transmitting over the second data link;
   causing the first and second data links to enter a hibernation state when it is determined that the client device is not transmitting on the second data link; and
   causing the first and second data links to enter the hibernation state after a delay when it is determined that the client device is transmitting on the second data link, wherein the first and second data links communicate.

2. The method of claim 1, wherein the first data link supports a data rate that is at least an order of magnitude faster than the data rate supported by the second data link.

3. The method of claim 2, further comprising transmitting data over the first data link in one or more N-phase polarity encoded data symbols.

4. The method of claim 3, wherein the first and second data links are provided in an apparatus that houses the client device and a host device, wherein the N-phase polarity encoded data symbols are transmitted by the host device and include 3-phase encoded data symbols.

5. The method of claim 3, wherein the command comprises a data link shutdown packet and wherein the data rate supported by the second data link is determined based on information provided in the data link shutdown packet.

6. The method of claim 5, wherein the information provided in data link shutdown packet includes a divisor for frequency dividing a clock extracted from the first data link.

7. The method of claim 3, wherein data communicated over the second data link is transmitted using a clock derived from the N-phase polarity encoded data symbols.

8. The method of claim 7, wherein data communicated over the second data link is clocked in synchronism with the N-phase polarity encoded data symbols.

9. The method of claim 7, wherein causing the first and second data links to enter a hibernation state includes terminating transmission on the first data link.

10. The method of claim 9, wherein terminating transmission on the first data link terminates the clock, thereby preventing communication through the second data link.

11. The method of claim 9, further comprising causing the first and second data links to exit the hibernation state responsive to a wakeup signal received from the client device.

12. The method of claim 2, wherein the command is carried in a data packet.

13. The method of claim 2, wherein the delay has a duration sufficient to ensure that the client device has received the data packet carrying the command.

14. The method of claim 2, wherein the delay has a duration determined by a packet transmission time associated with the first data link.

15. The method of claim 14, wherein the delay has a duration determined by a packet transmission time associated with the second data link.

16. An apparatus for wireless communication, comprising:
    means for transmitting a command to a client device over a first data link, the command comprising an instruction revoking permission to transmit data over a second data link;
    means for determining whether the client device is transmitting over the second data link;
    means for causing the first and second data links to enter a hibernation state when it is determined that the client device is not transmitting on the second data link, wherein the first and second data links enter the hibernation state after a delay when it is determined that the client device is transmitting on the second data link.

17. The apparatus of claim 16, wherein the first data link supports a data rate that is at least an order of magnitude faster than the data rate supported by the second data link.

18. The apparatus of claim 17, wherein data communicated over the first data link comprises N-phase polarity encoded data symbols.

19. The apparatus of claim 18, wherein the first and second data links are provided in an apparatus that houses the client device and a host device, wherein the N-phase polarity encoded data symbols are transmitted by the host device and include 3-phase encoded data symbols.

20. The apparatus of claim 18, wherein the command comprises a data link shutdown packet and wherein the data rate supported by the second data link is determined based on information provided in the data link shutdown packet.

21. The apparatus of claim 20, wherein the information provided in data link shutdown packet includes a divisor for frequency dividing a clock extracted from the first data link.

22. The apparatus of claim 18, wherein data communicated over the second data link is transmitted using a clock derived from the N-phase polarity encoded data symbols.

23. The apparatus of claim 22, wherein data communicated over the second data link is clocked in synchronism with the N-phase polarity encoded data symbols.

24. The apparatus of claim 22, wherein the means for causing the first and second data links to enter a hibernation state terminates transmission on the first data link.

25. The apparatus of claim 24, wherein the clock is terminated when transmission on the first data link is terminated.

26. The apparatus of claim 24, further comprising means for causing the first and second data links to exit the hibernation state responsive to a wakeup signal received from the client device.

27. The apparatus of claim 17, wherein the command is carried in a data packet.

28. The apparatus of claim 17, wherein the delay has a duration sufficient to ensure that the client device has received the data packet carrying the command.

29. The apparatus of claim 17, wherein the delay has a duration determined by a packet transmission time associated with the first data link.

30. The apparatus of claim 29, wherein the delay has a duration determined by a packet transmission time associated with the second data link.

31. An apparatus for wireless communication, comprising:
a processing system configured to:
    transmit a command to a client device over a first data link, the command comprising an instruction revoking permission to transmit data over a second data link;
    determine whether the client device is transmitting over the second data link;
    cause the first and second data links to enter a hibernation state when it is determined that the client device is not transmitting on the second data link; and
    cause the first and second data links to enter the hibernation state after a delay when it is determined that the client device is transmitting on the second data link.

32. A computer program product, comprising:
a computer-readable medium comprising code for:
    transmitting a command to a client device over a first data link, the command comprising an instruction revoking permission to transmit data over a second data link;
    determining whether the client device is transmitting over the second data link;
    causing the first and second data links to enter a hibernation state when it is determined that the client device is not transmitting on the second data link; and
    causing the first and second data links to enter the hibernation state after a delay when it is determined that the client device is transmitting on the second data link.

* * * * *